US009009069B2

(12) United States Patent
Brenny et al.

(10) Patent No.: US 9,009,069 B2
(45) Date of Patent: Apr. 14, 2015

(54) PHASED DEBIT ACTIVATION SYSTEM AND METHOD

(75) Inventors: Joseph Brenny, Minneapolis, MN (US); David B. Smith, Falcon Heights, MN (US); Michael Thomas Bahl, Plymouth, MN (US)

(73) Assignee: Target Brands, Inc., Minneapolis, MN (US)

( * ) Notice: Subject to any disclaimer, the term of this patent is extended or adjusted under 35 U.S.C. 154(b) by 491 days.

(21) Appl. No.: 13/370,536

(22) Filed: Feb. 10, 2012

(65) Prior Publication Data

US 2013/0211935 A1    Aug. 15, 2013

(51) Int. Cl.
  *G06Q 20/20* (2012.01)
  *G06Q 20/28* (2012.01)
  *G06Q 20/34* (2012.01)

(52) U.S. Cl.
  CPC .............. *G06Q 20/20* (2013.01); *G06Q 20/28* (2013.01); *G06Q 20/347* (2013.01); *G06Q 20/349* (2013.01)

(58) Field of Classification Search
  CPC combination set(s) only.
  See application file for complete search history.

(56) References Cited

U.S. PATENT DOCUMENTS

| 5,420,926 | A | 5/1995 | Low et al. |
|---|---|---|---|
| 5,450,051 | A | 9/1995 | Stromberg |
| 5,696,908 | A | 12/1997 | Muehlberger et al. |
| 6,820,803 | B1 | 11/2004 | Browning et al. |
| 7,104,443 | B1 | 9/2006 | Paul et al. |
| 7,252,226 | B2 | 8/2007 | Risafi et al. |
| 7,445,147 | B2 | 11/2008 | Hein |
| 7,766,225 | B2 | 8/2010 | Walsh et al. |
| 7,775,426 | B2 | 8/2010 | Paul et al. |
| 8,061,596 | B2 | 11/2011 | Hogg et al. |
| 2002/0029195 | A1* | 3/2002 | Russell et al. ................... 705/40 |
| 2004/0007618 | A1 | 1/2004 | Oram et al. |
| 2005/0082364 | A1 | 4/2005 | Alvarez et al. |
| 2006/0078100 | A1 | 4/2006 | Risafi et al. |
| 2007/0034688 | A1 | 2/2007 | Burke |
| 2008/0116258 | A1* | 5/2008 | Kane ............................. 235/380 |
| 2008/0235085 | A1 | 9/2008 | Kovinsky et al. |
| 2009/0026253 | A1 | 1/2009 | Pilla |
| 2010/0088168 | A1 | 4/2010 | Sullivan et al. |
| 2011/0161185 | A1* | 6/2011 | Antoo et al. ..................... 705/16 |

(Continued)

OTHER PUBLICATIONS

Office Action from Canadian Patent Application No. 2,767,500, mailed Jun. 5, 2012 (4 pages).

(Continued)

*Primary Examiner* — Luna Champagne
(74) *Attorney, Agent, or Firm* — JoAnn M. Seaton; Griffiths & Seaton PLLC (57) ABSTRACT

A method of facilitating activation of a general-purpose reloadable (GPR) card includes reading an activation storage medium from a GPR card using a point-of-sale (POS) terminal, wherein the GPR card is linked to a GPR account stored on a database. The method further includes collecting identification information from a card applicant and forwarding the collected identification information to a financial processing network, submitting an initial monetary amount to be loaded to the GPR account to the financial processing network, and communicating initial activation of the GPR account to the card applicant at the POS terminal after receiving activation approval from the financial processing network. The initial activation of the GPR account is a first phase of activation in a multiple phase activation characterized by the GPR account being available for use toward a price of purchases and unavailable for loading an additional monetary amount to the GPR account.

17 Claims, 6 Drawing Sheets

(56) References Cited

U.S. PATENT DOCUMENTS

2011/0196753 A1* 8/2011 Hodgdon et al. ............... 705/16
2013/0091060 A1* 4/2013 Kundu ........................... 705/44

OTHER PUBLICATIONS

Imani, V., "How to Activate a Visa Debit Card Over the Phone," www.ehow.com/how_5579427_activate-debit-card-over-phone. html, publicly available at least as early as 2009 (2 pages).

McGimpsey, Tom, "Selecting a Secure and Compliant Prepaid Reloadable Card Program" First Date Corporation, copyright 2009 (7 pages).

Gillen, Red, "Where the Banks Aren't: Advances in Branded Prepaid Cards," www.gtnews.com/article/7067.cfm, Jan. 28, 2008 (4 pages).

Villarreal, Phil, "I Found My Pre-Paid Walmart MoneyCard Impossible to Use," http://consumerist.com/2010/06/i-found-my-prepaid-walmart-moneycard-impossible-to-use.html, Jun. 14, 2010 (14 pages).

Office Action from Canadian Patent Application No. 2,767,500, mailed Oct. 1, 2013 (7 pages).

McGimpsey, "Selecting a Secure and Compliant Prepaid Reloadable Card Program" First Data Corporation, 2009 (7 pages).

Office Action from Canadian Patent Application No. 2,767,500, mailed Mar. 22, 2013 (4 pages).

Office Action from Canadian Patent Application No. 2,767,500, mailed Jul. 24, 2014 (7 pages).

"A Guide to Prepaid Cards for Transit Agencies", printed from www.smartcardalliance.org, Feb. 2011 (38 pages).

* cited by examiner

PHASED DEBIT ACTIVATION SYSTEM AND METHOD

BACKGROUND OF THE INVENTION

Financial products and/or accounts such as credit, debit, loan and insurance products have long been provided to consumers. These financial products generally are only available to consumers following completion and approval of an application to receive the products and/or services associated with such products. At times, the typical paper-based application process can be confusing and intimidating to consumers who are not familiar with the associated terminology, paperwork, etc. In recent years, debit and other transaction cards and their activation materials can be accessed or purchased from a retail store. While credit products are sometimes fully activated at a point-of-sale in the retail store, debit or, more specifically, general-purpose reloadable cards have generally required a user to complete the entire application process from their home via phone, Internet, or mail after accessing or purchasing the activation materials from the associated merchant.

SUMMARY OF THE INVENTION

One aspect of the present invention relates to a method of facilitating activation of a general-purpose reloadable (GPR) card. The method includes reading an activation storage medium from a GPR card using a point-of-sale (POS) terminal, wherein the GPR card is linked to a GPR account stored on a database, and the activation storage medium includes an identification number corresponding to the GPR account. The method further includes collecting identification information from a card applicant at the POS terminal and forwarding the collected identification information to a financial processing network, submitting, using the POS terminal, an initial monetary amount to be loaded to the GPR account linked to the GPR card to the financial processing network, and communicating initial activation of the GPR account to the card applicant at the POS terminal after receiving activation approval from the financial processing network. The initial activation of the GPR account is a first phase of activation in a multiple phase activation. The first phase of activation is characterized by the GPR account being available for use toward a price of purchases and unavailable for loading an additional monetary amount to the GPR account. In a second phase of activation of the multiple phase activation, which occurs after the first phase of activation, the GPR account additionally is configured to be loaded with the additional monetary value. Other cards, packaged products, and associated methods are also disclosed.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention merely provides example embodiments and is not intended to limit the invention or the application and uses of the invention. Furthermore, there is no intention to be bound by any theory presented in the preceding background of the invention or the following detailed description of the invention.

General-Purpose Reloadable (GPR) accounts and cards provide prepaid accounts usable anywhere other cards processed under similar retail electronic payment processing networks or brands, e.g., Visa®, MasterCard®, American Express®, and Discover®, are accepted. GPR accounts provide underserved consumers and others with the convenience, safety, and prestige of using a card branded by a well-known, retail electronic payment-processing network. Underserved consumers include consumers who do not have bank accounts, have limited access to credit, use check-cashing services, and/or otherwise do not qualify or have a low level of qualification for traditional banking services. Since the number of underserved consumers in the United States is estimated to be about 80 million, the need for GPR cards is significant.

GPR accounts provide consumers the ability to pay bills, obtain cash at automated teller machines (ATMs), and make purchases anywhere other cards serviced by the selected retail electronic payment processing network are accepted (e.g., brick-and-mortar, online, mail-order, telephone and other merchants), in other words, using open-loop networks rather than closed-loop networks, which are generally limited to one merchant or related merchants. In addition, GPR accounts provide the readily available customer service of typical credit programs rather than the limited hours, etc. that may be offered by local banks In one embodiment, GPR accounts can even be set up with direct deposits, other scheduled funding, and scheduled payment withdrawal similar to a typical banking account.

The present invention provides a method and associated system for accelerated, phased activation of a GPR account and, in one embodiment, incorporates a tangible, GPR account product in a merchant store where the GPR account product is associated with a prepaid, open loop financial account. In one embodiment, the GPR account product is configured to be displayed on a support rod or other support within a product display of a merchant store, e.g., near other for-sale merchandise or in other heavily trafficked areas, and includes a physical card or temporary card substitute that can be used throughout the life of an associated account or until a personalized card corresponding with the account can be obtained. Location in a merchant store increases the visibility of the card, thereby, encouraging consumers viewing the product to access and activate a GPR account and/or tell their friends and family about the availability of the product.

A consumer takes the GPR product to a point-of-sale (POS) terminal at the merchant store, and, e.g., as part of a purchase transaction for other goods, information is collected from the consumer and the associated account is funded with an initial load and is partially activated to enter a first activation phase or first level of activation. When the consumer leaves the POS terminal, the GPR account is already activated and available for use as a payment device. Additional identification and approval checks, e.g., including detailed and more time consumer identification checks required by law, are performed in the forty-eight hours or so following activation at the POS terminal. The identification checks required by law for GPR accounts generally are increased as compared with other credit products due at least in part to the popularity of GPR accounts with criminal and terrorist groups. When such checks are completed, a second activation phase (i.e., a second level of activation) is entered in which a user may additionally reload the GPR account with funds. Finally, after additional necessary processing steps are completed, a personal identification number (PIN) is sent to the consumer.

Upon receipt of the PIN, a third and final activation phase (e.g., a third level of activation) is entered in which money can be withdrawn from the GPR account via ATMs and other suitable money dispensing units or systems. In this manner, a consumer is given automatic access to initially loaded funds in the GPR account while still allowing required and other checks to be performed at a later time. This process simplifies the activation process from a consumer standpoint, which, in turn, decreases consumer frustration and increases consumer satisfaction with both the merchant distributing and the network servicing the GPR product.

Figure 1:
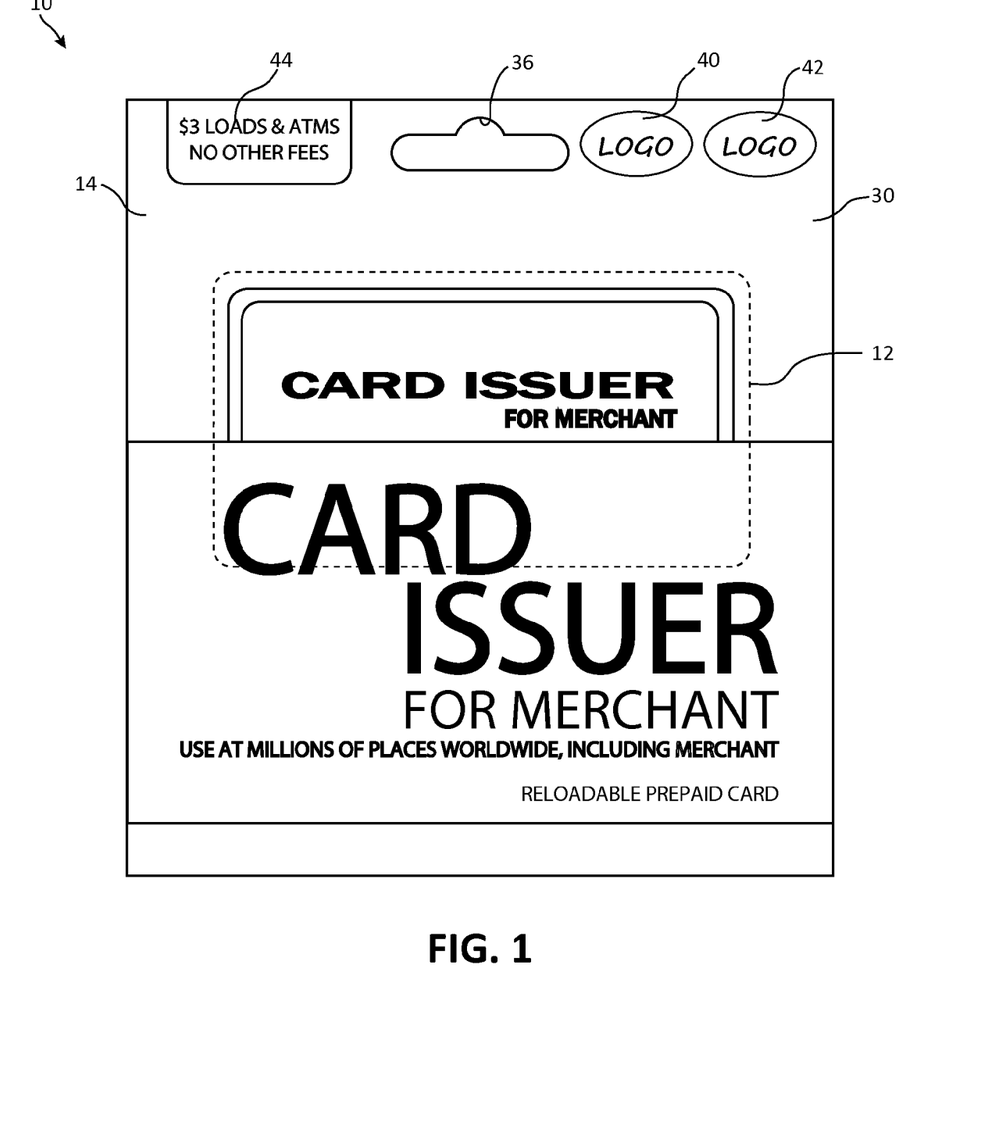
FIG. 1 is a front view illustration of a general-purpose reloadable product accessible in a merchant store, according to one embodiment of the present invention.
Figure 2:
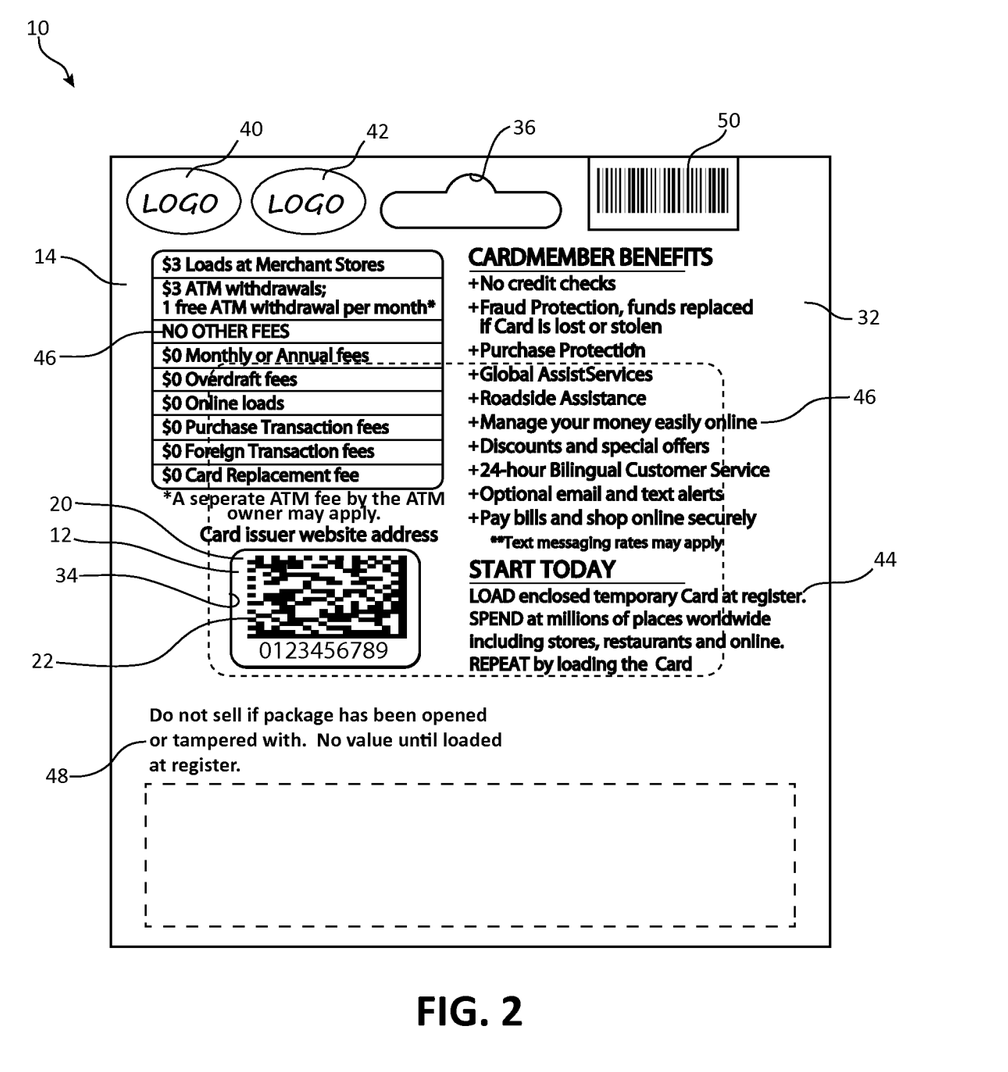
FIG. 2 is a rear view illustration of the general-purpose reloadable product of FIG. 1, according to one embodiment of the present invention.

Turning to the figures, FIGS. 1 and 2 illustrate a GPR product 10 including a GPR card 12, the perimeter of which is generally indicated with hidden lines in FIGS. 1 and 2, a package 14, terms sheets, instructions, etc. (not shown) as will be apparent to those of skill in the art upon reading this application. In one embodiment, GPR product 10 includes all the necessary data to substantially automatically initiate an electronic application and activation process when GPR product 10 is presented at a point-of-sale (POS) terminal 16 (FIGS. 3 and 4) in a retail setting.

GPR card 12 can take any suitable readily acceptable form. In one example, a main body of GPR card 12 is a substantially planar substrate 20 (FIG. 2), which is formed of polymeric or other suitable material substrate. At least one storage medium (not shown) is disposed on, embedded within, or printed on the substrate and is configured for repeated use to access and debit the GPR account during purchase transactions. The at least one storage medium may include read only components, such as a bar code printed on the substrate, and/or may be readable and writable, such as a magnetic storage medium (e.g., magnetic strip), radio frequency identification (RFID) device, integrated circuit, etc. The at least one storage medium on substrate 20 encodes or otherwise contains or stores a card number uniquely identifying the particular GPR card 12. Since the GPR card 12 is unassociated with any particular individual when it is initially displayed for purchase, the at least one storage medium is characterized by an absence of any personal identification information.

In one embodiment, GPR card 12 includes a secondary or activation storage medium 22 (FIG. 2). Activation storage medium 22 includes information that, when scanned by a POS terminal 16 triggers POS terminal 16 to begin the GPR account activation process (described below). In one example, activation storage medium 22 is in the form of a linear or two-dimensional bar code, magnetic strip, a smart chip or other electronic device, a radio frequency identification (RFID) device or other suitable identifier readily machine readable by POS terminal 16. Activation storage medium 22 includes information indicating the GPR account that is linked to GPR card 12 and information configured to, when read by POS terminal 16, trigger the POS terminal 16 to enter the proper card activation mode and begin the GPR account activation process in-lane at the retail setting. As such, the activation storage medium 22 includes all the non-personal information used to instruct POS terminal 16 to begin GPR account activation for the particular GPR account linked to GPR card 12. Otherwise stated, when POS terminal 16 scans activation storage medium 22, the GPR account linked to GPR card 12 is identified and can subsequently be activated, have amounts debited therefrom, and/or have amounts added thereto.

In one embodiment, carrier or package 14 of GPR product 10 is configured to support and, in one example, enclose GPR card 12 and any associated terms or instruction sheets. Although package 14 may have any one of a variety of suitable configurations, as illustrated, package 14 includes a front panel 30 and a rear panel 32 secured to one another around their coterminous perimeters to form a cavity (not shown) therein for securely maintaining GPR card 12 and terms and instruction sheets. Package 14 permits POS terminal 16 access to activation storage medium 22, for example, by including a hole 34 therethrough providing direct access to activation storage medium 22. As illustrated, hole 34 is formed in rear panel 32, but hole 34 can be formed through any suitable portion of package 14.

Terms and instruction sheet(s) maintained in package 14 may be a single sheet or may be one sheet of a plurality of sheets joined together to form a booklet, pamphlet, etc. or provided as a plurality of loose-leaf sheets. Terms and instruction sheet(s) include term details regarding GPR account of GPR product 10 such as information regarding online or phone access to the account or corresponding support services, fees, interest rates, reasons for termination, repayment details, etc. When folded into or otherwise formed in a suitable size, terms and instruction sheet(s) are configured to easily fit within the cavity formed by package 12.

In one embodiment, front and rear panels 30 and 32 are each formed of a single layer or multiple layers of paper, plastic, or composite material, for example, generally in the form of a relatively stiff but bendable/flexible card. Front and rear panels 30 and 32 are securely coupled to one another such that one cannot remove GPR card 12 from package 14 without causing significant and readily identifiable damage to package 14 to prevent tampering or theft of GPR card 12. Including activation storage medium 22 on GPR card 12 itself instead of on package 14 provides additional safeguards to tampering, fraud, or theft. In particular, if GPR card 12 is removed or even moved in package 14 it will no longer be present and/or will no longer properly align with hole 34 and a merchant team member and POS terminal 16 generally will not be able to access the necessary information, e.g., activation storage medium 22. In one example, package 14 includes a hanging aperture 36 to facilitate hanging of GPR product 10 in retail setting, e.g., via hanging GPR product 10 from a support arm or hook (not shown).

Package 14 includes a variety of information designed to promote activation of the enclosed GPR card 12, and of similar GPR cards in general, and to provide the consumer with enough information to allow them to make a decision whether or not the terms associated with GPR card 12 are sufficiently appealing to the consumer to prompt the consumer to bring the GPR product 10 to POS terminal 16 for activation of the closed GPR card 12. For example, package 14 may include one or more of a merchant logo 40, a processing network logo 42, "how it works" or product description indicia 44, term indicia 46, etc.

Product description indicia 46 include information identifying that GPR product 10 is associated with a GPR account and information regarding that account and how it works. For example, product description indicia 44 may identify the general functionality of GPR card 12, associated support services, and/or associated incentives therewith. Term indicia 46 include information regarding fees and/or limitations associated with GPR card 12 and legal notifications. As illustrated, term indicia 46 include both items indicated with text in FIGS. 1 and 2 and with a dashed box in FIG. 2. In one example, term indicia 46 include fee indicia and/or a listing of services associated with the GPR account.

In one example, package 14 includes processing directions 48, which provide instructions for a retail store employee or other individual at the point of sale regarding how to process GPR product 10 to facilitate the account electronic application process. As illustrated, processing directions 48 instruct the merchant team member (not shown) operating POS terminal 16 not to sell or attempt to activate a GPR card 12 if package 14 has been opened or tampered with. In other embodiments, processing directions 48 instruct the retail store employee to scan or otherwise read an identifier associated with the account, to point out an included terms sheet and/or other details to the consumer, and to complete the electronic application process. In one example, an additional bar code 50 or other identifying, machine-readable indicia item may be included for inventory or other non-account specific but item-type specific identification reasons. Other processing directions will be apparent to those of skill in the art upon reading this application.

Figure 3:
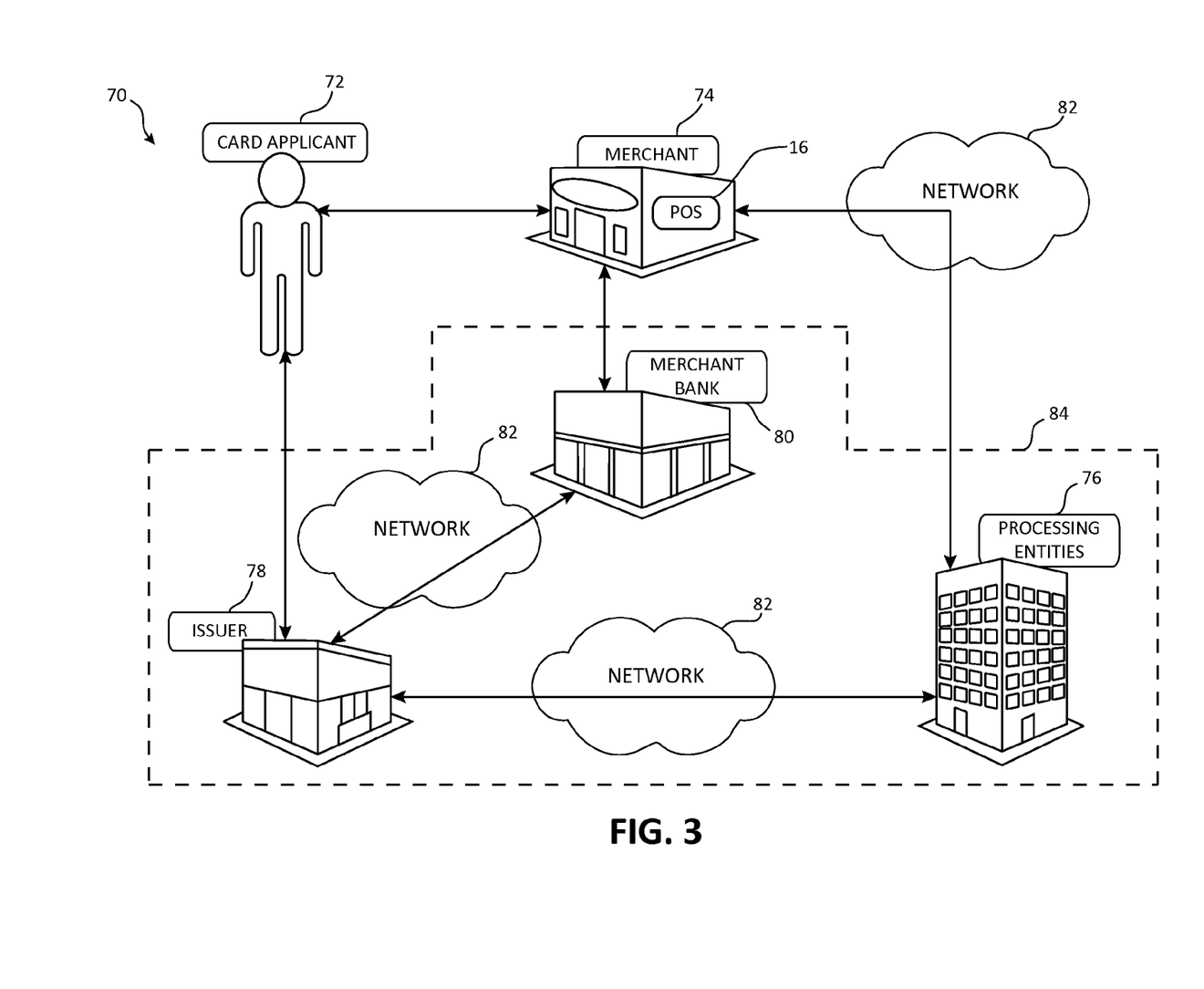
FIG. 3 is a schematic illustration of general-purpose reloadable account activation system, according to one embodiment of the present invention.

FIG. 3 is a schematic illustration of a prepaid or GPR account activation and support system 70 configured to facilitate the GPR phased activation process as will be further described below. In one embodiment, GPR account activation system 70 includes a consumer or card applicant 72, a merchant 74, processing entities 76, an issuer 78, and a merchant bank 80. Merchant 74 serves as a distributor providing GPR product 10 on its shelves or other displays alongside other common merchandise and/or behind POS counters and/or at other suitable locations within its stores, associated kiosks, etc. Merchant 74 additionally includes POS terminal 16, which is configured to process typical merchandise for retail sale and to activate and facilitate loading of GPR card 12 with funds, sometimes both in the same transaction.

Card applicant 72 generally is the individual desiring to have a GPR account who selects GPR product 10 from its display position and presents GPR product 10 at POS terminal 16 for activation and loading. As primarily described, card applicant 72 physically visits a retail setting operated by merchant 74 and selects and presents the physical version of GPR product 10. However, it is also contemplated that card applicant 72 may, in some circumstances, be able to select a representation of GPR product 10 during an online purchase and complete the activation and loading process during the checkout purchase/transaction from their personal computer as will be apparent to those of skill in the art upon reading the present application.

Figure 4:
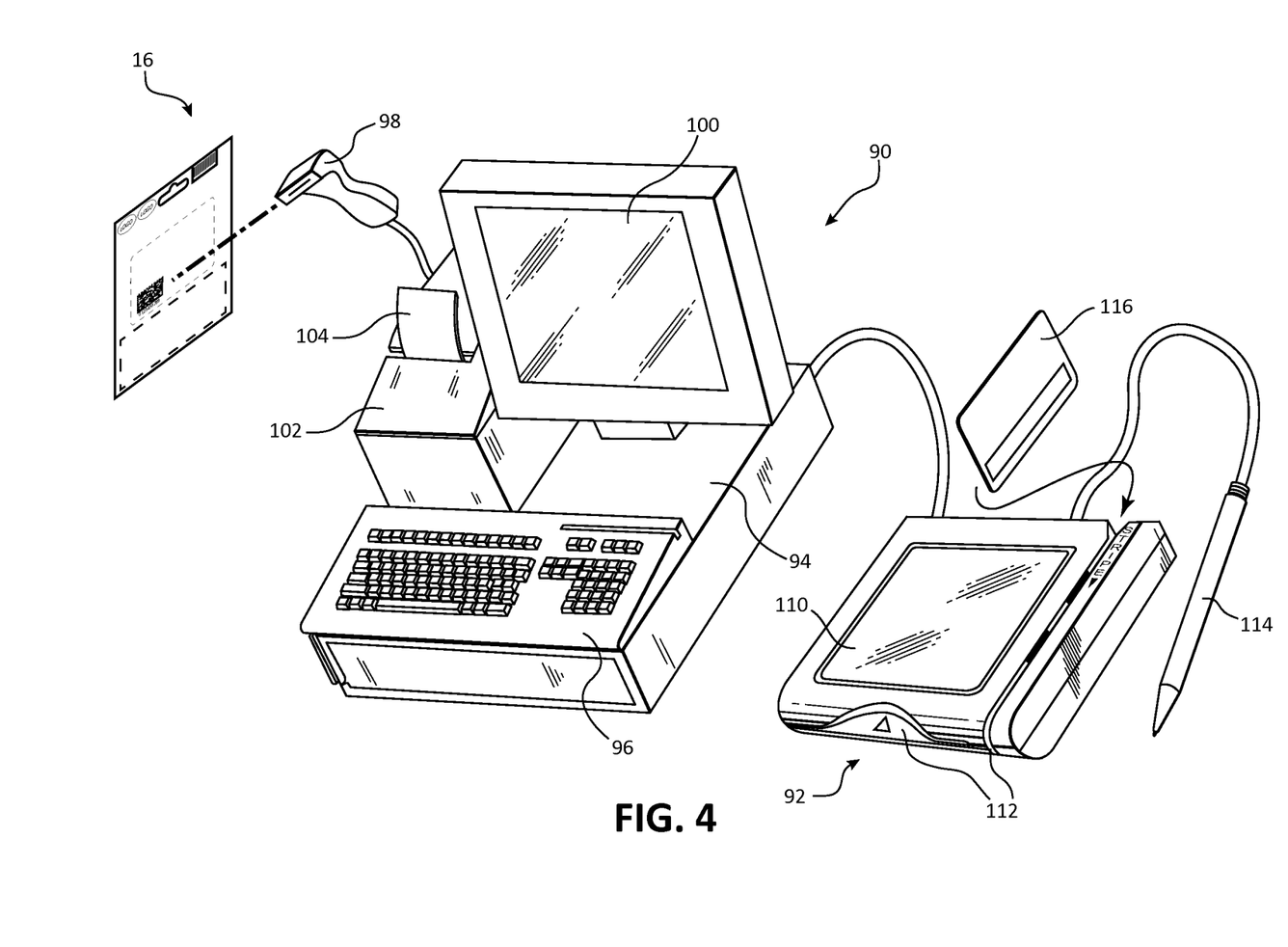
FIG. 4 is perspective view illustration of a point-of sale terminal in a merchant store, according to one embodiment of the invention.

FIG. 4 illustrates one embodiment, of many other possible embodiments as will be apparent to one of skill in the art upon reading this application, of a POS terminal 16 provided as part of merchant 74, e.g., located within a merchant store. In one embodiment, POS terminal 16 includes a POS attendant or team member portion 90 and a consumer communication portion 92. Team member portion 90 is the primary portion of POS terminal 16 and includes a processing unit 94, a keyboard 96, a scanner 98, a monitor 100, and a printer 102, for example. Processing unit 94 is a hardware component specifically configured to run the dedicated software for proceeding items for sale and activating GPR card 12. Processing unit 94 receives information from other portions of POS terminal 16, e.g., keyboard 96, scanner 98, monitor 100, and consumer communication portion 92 and communicates with other units, e.g., a central merchant system (not shown) and/or components of GPR account activation and support system 70 via various private or public networks as deemed appropriate.

For example, a merchant attendant or merchant team member (not shown) operates team member portion 90 and interfaces with processing unit 94 via keyboard 96, scanner 98, touch screen monitor 100, and/or other suitable components of POS terminal 16. In one embodiment, the merchant team member uses scanner 98 to both scan bar codes from products being purchased and to scan activation storage medium 22 to begin the GPR card activation process. During the activation methods described below, POS terminal 16 communications with the merchant team member providing the merchant team member prompts for taking action via monitor 100 and/or communicates with card applicant 72 directly via consumer communication portion 92 as part of the method described in additional detail below. Upon completion of the financial transaction and/or activation, printer 102 prints transaction details to a receipt 104 including a list of the purchases purchased during a transaction. In one embodiment, receipt 104 includes a printout of additional personal information and/or confirmation of activation and loading of GPR card 12 when the in-lane portion of the activation process is completed while, in other embodiments, receipt 104 contains no additional information regarding GPR card 12 other than its purchase, that is, charge for initial load and any associated fee.

Consumer communication portion 92 is coupled with processing unit 94 and provides a mechanism for processing unit 94 to communicate directly with a consumer, e.g., card applicant 72 and vice versa. In one embodiment, consumer communication portion 92 includes a display screen 110, a card reception slot 112, and/or a stylus 114. Screen 110 displays various graphical interfaces to card applicant 72 to communicate information to and/or request information from card applicant 72. In one example, screen 110 has touch-screen capabilities such that a user can directly touch or use stylus 114 to touch screen 110 and enter information. In one example, where screen 110 does not have touch screen capabilities, an additional number pad or small keyboard maybe included and accessible by card applicant 72.

Card reception slot 112, which is shown in two configurations in FIG. 4, includes an internal scanner and is, in one example, configured to receive various identification and financial transaction cards 116 to read data from the machine readable storage mediums of such cards 116. As illustrated, card reception slot 112 extends along a side of screen 110 allowing card 116 to be swiped therethrough or is positioned at one end of screen 110 and being configured to slidably and near fully receive card 116 for reading information from a magnetic strip of card 116. Card 116 maybe a typical payment card, GPR card 12, a driver's license, etc.

In one embodiment, card reception slot 112 is configured to selectively receive card 116 as financial transaction card 22 is slid from one end to another of card reception slot 112 or inserted into card reception slot 112 depending upon the embodiments of card reception slot 112 utilized. Stylus 114 also allows a user to enter a user signature and/or other confirmation indicator into screen 110 to approve or confirm the transfer of funds from the financial account to complete a purchase and/or activation.

Additionally referring to FIG. 3, POS terminal 16, and thereby, merchant 74 as a whole is in communication with at least one financial network, e.g., generally indicated in FIG. 3 by reference numeral 84 as including processing entities 76, issuer 78, and merchant bank 80. The participants or members of financial processing network 84 can vary as will be apparent to one of skill in the art upon reading this application, and one basic embodiment is described herein.

Processing entities 76 represent the various entities that perform portions of the communication process from merchant 74 to issuer 78 using the selected retail electronic payment processing network or card brand processes. For example, each entity in processing entities 76 may perform security, encryption, other translation, or routing procedures associated with a card brand such as MasterCard®, Visa®, American Express®, Discover®, etc. In one embodiment, information communicated between the various entities in processing entities 76 requires a number of various security and other checks and each entity may require a different information format, other entities may be utilized to translate information from one format to another.

Processed information from processing entities 74 passes from processing entities 76 to issuer 78 or related processor where issuer 78 maintains the GPR account and maintains the associated database tracking monetary account. Issuer 78 is the actual bank or entity that maintains the monetary value associated with the account, services requests to debit value from or add value to the GPR account, etc. In one embodiment, issuer 78 communicates with card applicant 72, e.g., by providing card applicant 72 with a personal identification number, personalized replacement or permanent GPR card (not shown). Issuer 78 also, in one example, communicates with merchant bank 80 to transfer funds to merchant bank 80 following transactions by consumers holding established, previously activated GPR accounts with issuer 78, in which purchases were charged to the GPR account. Processing entities 76 and issuer 78 or other network members are collectively referred to herein as financial processing network 84.

Figure 5:
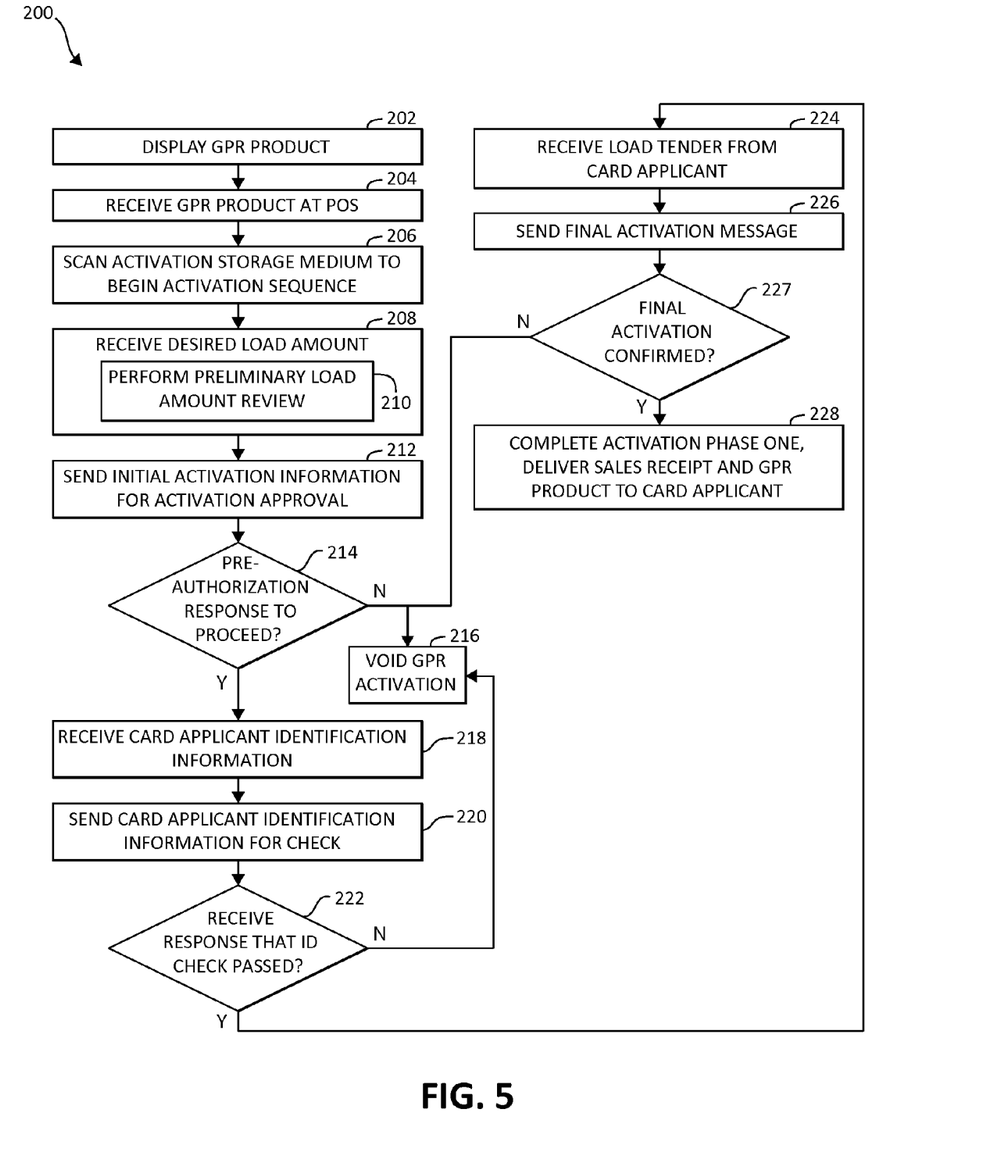
FIG. 5 is a flow chart illustrating a merchant method of processing an application associated with a general-purpose reloadable product accessed in a merchant store, according to one embodiment of the present invention.

FIG. 5 is a flow chart illustrating one example of a method 200 of activating a GPR account from a perspective of merchant 74. At 202, merchant 74 displays GPR product 10 to potential consumers such that the various indicia on package 14 both promote the activation of GPR products 10 and inform consumers regarding the features, terms, and fees associated with GPR product 10. At 204, a GPR product 10 selected by a consumer is received at POS terminal 16 such that the consumer may be characterized as card applicant 72. POS terminal 16 scans activation storage medium 22 from GPR product 10 to begin executing the activation sequence. In one embodiment, method 200 is largely performed by merchant 72, via POS terminal 16, prompting team member and/or card applicant 72 action via graphical user interfaces presented via touch screen monitor 100 and screen 110. At 208, a desired load amount is received and entered to POS terminal 16. In one example, POS terminal 16 prompts the merchant team member to collect the information from card applicant 72 and enter the information into POS terminal 16 or card applicant 72 is directly prompted to enter the information via consumer communication portion 92. As part of operation 208, at 210 POS terminal 16 may perform a preliminary load amount review to check that the desired load amount falls within parameters (e.g., maximum and minimum load amounts) for the GPR account associated with the scanned activation storage medium 22.

At 212, merchant 74 sends initial activation information to financial processing network 84 for activation approval. In one embodiment, initial activation information includes at least the GPR account number information read from activation storage medium 22 and the requested load amount. After financial processing network 84 determines if the GPR account number is invalid, if the GPR account has a past date expiration, and if the load amount is inappropriate given card parameters and/or completes other suitable checks, POS terminal 16 receives a pre-authorization response stating whether activation should continue following review of the initial activation information. At 214, a pre-authorization response is received from financial processing network 84. If the response is to decline activation, GPR account activation is voided at 216 either automatically or the merchant team member is prompted via monitor 100 to void the activation and inform card applicant 72.

If, at 214, the received pre-authorization response is to proceed, consumer identification information is collected from card applicant 72 at 218. For example, POS terminal 16 prompts card applicant to enter identification information via consumer communication portion 92. More particularly, in one embodiment, screen 110 presents graphic interfaces prompting the user to swipe their driver's license or other identification card through card reception slot 112 thereby entering their identification information to POS terminal 16. Card applicant 72 is asked to verify that the identification information collected via driver's license swipe is accurate and is allowed to correct information if and as necessary. In addition, card applicant 72 provides, and POS terminal 16 receives, their social security number, date of birth, and phone number via consumer communication portion 92 of POS terminal 16. POS terminal 16 may further prompt for a mobile phone number of the card applicant and/or ask if card applicant 72 would like to receive communications regarding the GPR account via text. Once all identification information, including any identification information required by law to be collected for GPR accounts, is collected, card applicant 72 is allowed to review and verify the information and correct where and if necessary. If card applicant 72 refuses to provide the information required by law at POS terminal 16, activation of the GPR account is voided.

At 220, POS terminal 16 sends the card applicant identification through financial processing network 84 for verification. In one embodiment, the card applicant identification information is passed through at least a series of initial identification checks to be sure none of the provided information is inconsistent with records immediately available for near instantaneous review, while in other embodiments, no initial identification checks occur POS terminal 16. In one example, review of the card applicant identification information at this stage in process 200 stops short of (i.e., does not include) full review of the card application identification information against the Office of Foreign Assets Control (OFAC) Specially Designated National (SDN) list as required by law for the reloadable, prepaid, open-loop accounts such as the GPR account. Instead, the OFAC review is completed at a later time in the activation process.

At 222, POS terminal 16 receives a message indicating if the initial card applicant identification tests were passed. If the identification tests were not passed, then at 216, activation of the GPR account is voided. If the identification tests were passed, then at 224, POS terminal 16 prompts receipt of and receives tender from card applicant to load the GPR account with the previously specified load amount, e.g., a load amount between $0.01 and $1000 and any initial load or activation fees. After tender is successfully received, POS terminal 16 sends a final activation message to financial processing network 84, which, in turn, loads and partially activates the GPR account associated with the specific GPR product 12 being purchased. Assuming activation is confirmed at 227, then at 228, POS terminal 16 completes the initial activation placing the GPR account being activated in phase one activation, which allows for use of the initially loaded value toward a purchase of services or items, bill payment, or other non-cash withdrawals, but does not allow reloading of the GPR account or withdrawal of cash funds from the GPR account via ATM or similar terminal. In one example, as part of operation 228, card applicant 72 is provided with a receipt including the GPR account number or portion thereof, initial load amount, any fees charged, and end balance of the GPR account.

After operation 228, card applicant 72 is the holder of the GPR account, but since, during phase one activation, reloads and cash withdrawals are not allowed, the GPR account, at least temporarily, functions more like a non-reloadable prepaid card. After a subsequently performed OFAC check by financial processing network 84, the GPR account will become reloadable in phase two of activation, and following receipt of a PIN associated with the GPR account, will become usable for cash withdrawals in phase three of activation. In one embodiment, funds can be added to the GPR account via an associated online account, by phone, or at stores operated by or otherwise associated with merchant 74 (e.g., via the same or another POS terminal in a chain of stores operated by merchant 74) and/or fees may be charged to add such funds to the GPR account. In one example, recurring reloads from a specified funding source on a regular, periodic, or otherwise specified basis. The staged or phased operation of the GPR account allows all necessary government checks to be made while still allowing card applicant 72 to have immediate access to initially loaded funds.

For example, while non-reloadable prepaid cards are not required by law to pass the OFAC or similar checks, GPR accounts are required to pass such checks. OFAC checks are generally completed in batch mode at the end of a business day not instantaneously. So while it would be difficult, if not nearly impossible, to provide a fully activated GPR account at POS terminal 16, the phased activation makes it possible to have at least partial access to and use of the GPR account immediately following the activation transaction at POS terminal 16. More specifically, since a non-reloadable prepaid card does not require the full OFAC check, the GPR account can be given basic prepaid functionality as phase one before the OFAC check. Since card applicant 72 desires a fully functional GPR account and a fully reloadable GPR account is what is being offered via GPR product 10, that functionality is added in as the associated required checks and/or administrative items can be completed. For instance, once the OFAC check is completed, which usually occurs within two days of initial card activation and government requirements for a reloadable prepaid card have been met, the GPR account enters phase two activation adding in the ability to reload funds to the GPR account. Finally, once a PIN alone or a PIN with a user specific, new (e.g., personalized) GPR card can be provided to card application, then the GPR account enters and stays in activation phase three until its expiration where stage 3 activation allows cash withdrawals, e.g., via ATMs, which were not available in either of phase one or two.

Figure 6:
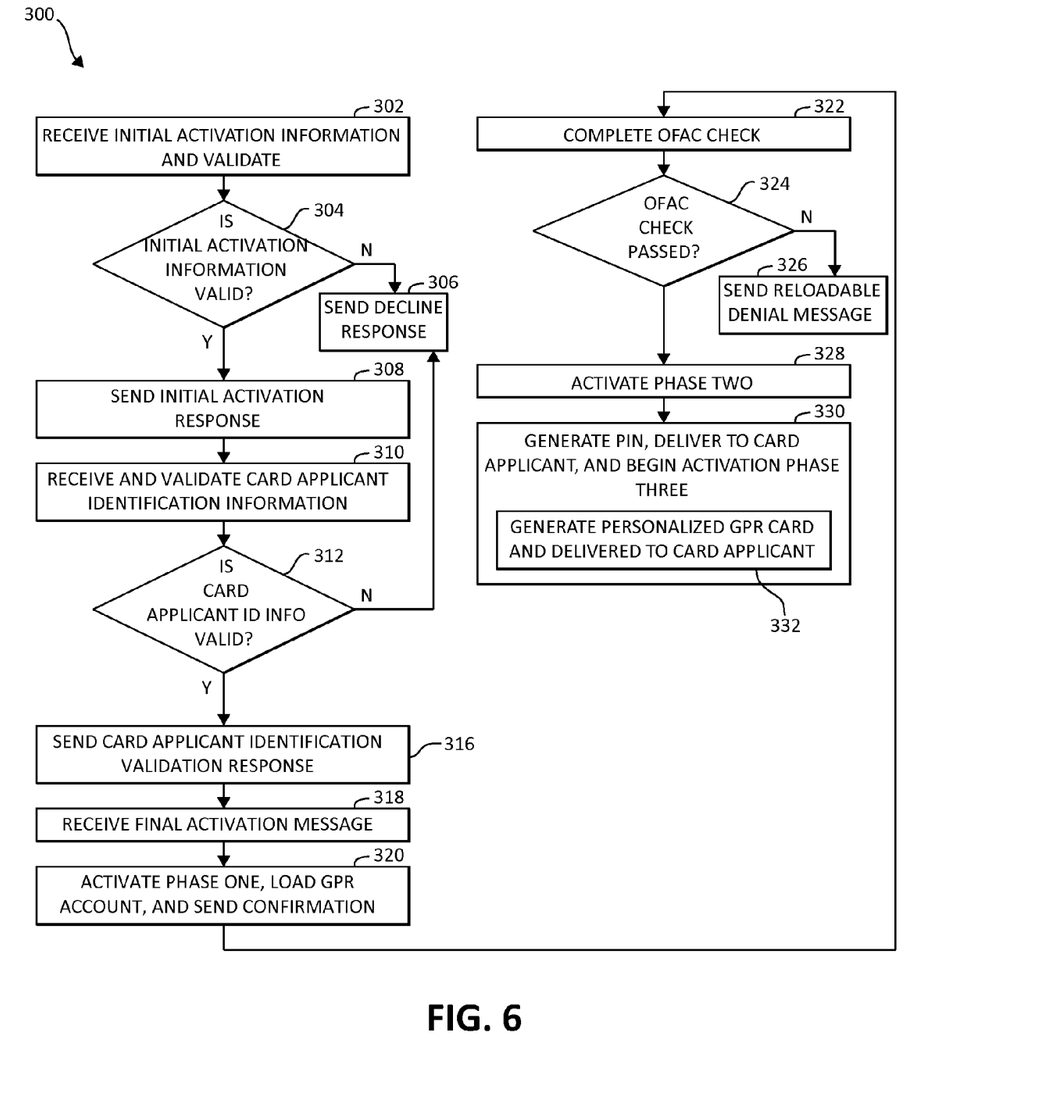
FIG. 6 is a flow chart illustrating a financial network method of processing an application associated with a general-purpose reloadable account product accessed in a merchant store, according to one embodiment of the present invention.

FIG. 6 is a flow chart illustrating one example of a method 300 for activating a GPR account from a perspective of financial processing network 84. At 302, financial processing network 84 receives initial activation information from merchant 74, e.g., from POS terminal 16, including a GPR account number corresponding with a particular GPR product 10 to be activated and a desired initial load amount. Financial processing network 84, e.g., issuer 78, checks that the GPR account corresponding with the received GPR account number has not previously been activated or otherwise deemed unavailable for activation, does not have a past due or very soon to be past due expiration date, and the desired load amount is appropriate in general for a GPR account and for any specific requirements of a desired state or local POS terminal 16 is located. If the account is unavailable for activation or expired or soon to be expired or if the desired load amount does not meet allowable parameters, then, at 304, initial activation information is considered invalid, and financial processing network 84 sends a decline activation response message to POS terminal 16 at 306.

If the initial activation information is determined to be valid at 304, then, an initial activation approval message is sent to POS terminal 16 at 308, which causes POS terminal 16 to continue the GPR account activation process. At 310, identification information from card applicant 72 is received (e.g., including a social security number, a date of birth, a phone number, and/or a mobile number) and checked against readily and substantially immediately available databases (e.g., not including OFAC SDN list) to determine if the information initially appears to be accurate. For example, local databases are checked to be sure all the identification information is consistent with each other and/or does not otherwise trigger any red flags. If the identification information does not pass such checks, then, at 305, an activation decline message is sent to POS terminal 16. If the identification information does pass the checks, then a card applicant identification validation response message is sent to POS terminal 16 at 316.

Following up on the identification validation response message sent at 316, at 318, financial processing network 84 receives a final activation message from POS terminal 16 including the load amount, verification that tender was received from card applicant 72, etc. Financial processing network 84 (e.g., largely issuer 78 based on communications from and sent back through processing entities 76), in turn, at 320, activates the corresponding GPR account to phase one, loads the corresponding GPR account with the previously indicated load amount, and sends POS terminal 16 confirmation that the account has been activated so that POS terminal 16 can complete the in-lane portion of the activation process.

In a first time period following initial card activation at 320, financial processing network 84 conducts additional identification verification procedures including completing the OFAC check against the OFAC SPN list and any other additional security checks desired and/or required by the U.S. or associated state governments at 322. In one example, the first time period is approximately one to 48 hours from the initial card activation at 320. If the OFAC check is not passed, the financial processing network 84, for example, issuer 78, sends card applicant a letter, email, text message, or other form of communication including a message that the corresponding GPR card 12 will not become reloadable, since the identification validation checks required by law for reloadable cards were not passed. In such circumstances, card applicant 72, now the cardholder, is still able to use their GPR card 12 as a prepaid card spending the balance initially loaded to the card at the POS terminal 16 during initial activation but will not be able to add additional funds or otherwise reload GPR card 12 or the account corresponding therewith.

If the additional identification verification at 322 is passed, then, at 328, the GPR account is updated from phase one activation to phase two activation and GPR card 12, more particularly the GPR account linked thereto, can be reloaded with additional funds via phone, internet, merchant 74, etc. as described above. In one embodiment, a message, e.g., a text message, is sent to card applicant 72 informing them of the activation phase change and/or their ability to reload the GPR account while in other messages the card applicant 72 is not specifically notified of the activation phase change or additional available functionality.

Finally, at 330, after a second time period from initial issuance at 320 is completed, issuer 78 or other related part that is included in financial processing network 84, generates a personal identification number (PIN) for the card applicant specifically associated with the activated GPR account and mails or otherwise securely communicates the PIN to card applicant 72. Second time period is longer than the first time period, e.g., another 24 to 76 hours longer than first time period, and PIN is generally received by card applicant 72 within 7-10 days of initial activation at 320. Upon sending the corresponding PIN, GPR account enters phase three of activation, which is full activation, and GPR card 12 can be used at ATMs and similar locations to withdraw cash funds from the linked GPR account using the PIN. In one embodiment, at 332, a personalized replacement GPR card 12 is sent to card applicant 72 including their personal identifying information, e.g., their name, with or separately from the PIN. In one embodiment, the card applicant 72 will continue using GPR card 12 originally activated as part of GPR product 10 and no personalized GPR card 12 will be sent thereby eliminating operation 332 from method 300.

As will be appreciated by one of ordinary skill in the art, aspects of the present invention may be embodied as a system, method, or computer program product. Accordingly, aspects of the present invention may be embodied entirely as hardware, entirely as software (including firmware, resident software, micro-code, etc.) or as a combination of software and hardware that may all generally be referred to herein as a "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, e.g., but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or processing unit. In the latter scenario, the remote computer may be connected to the user's computer through any type of network, or communication system, including, but not limited to, a local area network (LAN) or a wide area network (WAN), Converged Network, or the connection may be made to an external computer (e.g., through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A method of facilitating activation of a general-purpose reloadable (GPR) card comprising:
    reading an activation storage medium from the GPR card using a point-of-sale (POS) terminal, wherein the GPR card is linked to a GPR account stored on a database and the activation storage medium includes an identification number corresponding to the GPR account, and the GPR card is presented at the POS terminal by a card applicant;
    collecting identification information from the card applicant at the POS terminal and forwarding the collected identification information to a financial processing network;
    submitting, using the POS terminal, an initial monetary amount to be loaded to the GPR account linked to the GPR card to the financial processing network;
    communicating initial activation of the GPR account to the card applicant at the POS terminal after receiving activation approval from the financial processing network, wherein:

initial activation of the GPR account is a first phase of activation in a multiple phase activation, the first phase of activation is characterized by the GPR account being available for use toward a price of one or more purchases and unavailable for loading an additional monetary amount to the GPR account, and in a second phase of activation of the multiple phase activation, which occurs after the first phase of activation and only after completion of the identification verification process required by law for full GPR account activation, the GPR account additionally is configured to be loaded with the additional monetary value; and allowing reloading the GPR account with additional funds only after the second phase of activation occurs.

2. The method of claim 1, wherein collecting identification information includes collecting at least one of a driver's license number and a social security number in accordance with government requirements for the GPR account.

3. The method of claim 1, further comprising displaying the GPR card as part of a GPR product in a merchant store, the GPR product promoting the GPR card as allowing the GPR account to be loaded with additional monetary value.

4. The method of claim 1, further comprising instructing the card applicant that a personal identification number (PIN) will be provided to them at a future time and that after receipt of the PIN, cash can be withdrawn from the GPR account at appropriate terminals using the PIN, wherein the GPR account is in a third phase of activation when cash can be withdrawn from the GPR account, and the third phase of activation is the only phase of the first phase, the second phase, and the third phase when cash can be withdrawn from the GPR account.

5. The method of claim 1, wherein the POS terminal is a first POS terminal, the method further comprises receiving the GPR card at a second POS terminal and loading the GPR account linked to the GPR card with the additional monetary value only after the GPR account has at least been activated to the second phase of activation of the multiple phase activation.

6. The method of claim 1, further comprising charging a fee for loading the GPR account with the additional monetary value.

7. The method of claim 1, further comprising receiving a desired initial load amount from the card applicant and checking the desired load amount against a minimum initial load amount and a maximum load amount associated with the GPR account before submitting the initial monetary amount to the financial processing network.

8. The method of claim 1, further comprising receiving tender from the card applicant equal to the initial monetary value before communicating initial activation of the GPR account to the card applicant.

9. A method of activating and maintaining a general-purpose reloadable (GPR) account, the method comprising:

receiving, from a point-of-sale (POS) terminal, an account identification number corresponding with the GPR account, identification information corresponding with a consumer applying for the GPR account, and an initial monetary value to be loaded to the GPR account;

activating the GPR account to a first level of activation in which the GPR account is available to pay for purchases up to the initial monetary value, wherein the GPR account is unavailable for reloading with additional monetary value while in the first level of activation;

after activating the GPR account to the first level of activation, verifying the identification information; and following verifying the identification information, activating the GPR account to a second level of activation in which the GPR account can be reloaded with the additional monetary value.

10. The method of claim 9, wherein verifying the identification information includes checking the identification information against an Office of Foreign Assets Control Specially Designated National list.

11. The method of claim 9, further comprising:

generating a personal identification number (PIN) for the consumer following the activating the GPR account to the second level of activation; and sending the PIN to the consumer and activating the GPR account to a third level of activation, which is the only one of the first level of activation, the second level of activation, and the third level of activation allowing cash withdrawals from the GPR account.

12. The method of claim 11, allowing reloading of the GPR account during only the second level of activation and the third level of activation, wherein reloading of the GPR account is able to occur based on information received from the consumer via a phone communication, via an Internet communication, and via communication with a merchant affiliated with the GPR account.

13. The method of claim 9, wherein the POS terminal is located in a store of a merchant, and the GPR account is provided in association with the merchant.

14. A physical, non-transitory computer storage medium comprising a computer program product method for activating and maintaining a general-purpose reloadable (GPR) account, the physical, non-transitory computer storage medium comprising:

computer code for activating the GPR account to a first level of activation based on an account identification number corresponding with the GPR account, identification information provided by a consumer applying for the GPR account, and an initial monetary value to be loaded to the GPR account provided by the consumer, wherein the computer code for activating the GPR account to the first level of activation includes:

computer code for loading the GPR account with the initial monetary value and allowing purchasing debits from the GPR account up to the initial monetary value, and computer code for disallowing funding the GPR account with additional monetary value while the GPR account is in the first level of activation;

computer code for verifying the identification information after activation of the GPR account to the first level of activation; and computer code for activating the GPR account to a second level of activation, in which the GPR account can be reloaded with the additional monetary value, following verifying the identification information.

15. The physical computer storage medium of claim 14, wherein the computer code for verifying the identification information includes computer code for checking the identification information against an Office of Foreign Assets Control Specially Designated National list.

16. The physical computer storage medium of claim 14, further comprising:

computer code for generating a personal identification number (PIN) for the consumer following the activating the GPR account to the second level of activation and activating the GPR account to a third level of activation, which is the only one of the first level of activation, the second level of activation, and the third level of activation allowing cash withdrawals from the GPR account.

17. The method of claim 1, wherein:
 initial activation of the GPR account is completed prior to completion of the identification verification process required by law for full GPR account activation.

* * * * *